(12) United States Patent
Yoo et al.

(10) Patent No.: US 6,430,139 B1
(45) Date of Patent: Aug. 6, 2002

(54) OBJECTIVE LENS FOR HIGH-DENSITY OPTICAL FOCUSING, AND OPTICAL PICKUP USING THE SAME

(75) Inventors: Jang-hoon Yoo, Seoul; Kun-ho Cho, Suwon; Seung-tae Jung, Seongnam; Chul-woo Lee, Seoul; Chong-sam Chung; Dong-ho Shin, both of Seongam, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/671,710

(22) Filed: Sep. 28, 2000

(30) Foreign Application Priority Data

Sep. 29, 1999 (KR) .............................. 99-41767

(51) Int. Cl.[7] ................................ G11B 7/12
(52) U.S. Cl. ............................. 369/112.23; 369/112.08; 369/112.24; 369/44.23
(58) Field of Search ................... 369/44.11, 44.12, 369/44.23, 44.25, 44.27, 112.01, 112.02, 112.03, 112.05, 112.08, 112.13, 112.23, 112.24, 112.26

(56) References Cited

U.S. PATENT DOCUMENTS 6,266,315 B1 * 7/2001 Lee et al. .............. 369/112.01

* cited by examiner

Primary Examiner—Muhammad Edun
(74) Attorney, Agent, or Firm—Staas & Halsey LLP (57) ABSTRACT

A high-density focusing objective lens having a high numerical aperture (NA), which can be easily manufactured by an existing technique, and an optical pickup using the objective lens for high-density recording. The objective lens includes a first transmitting portion placed at a relatively near-axis region from the optical axis to divergently transmit an incident light beam; a first reflecting portion to divergently reflect the incident light beam, the first reflecting portion faces the first transmitting portion; a second reflecting portion, formed at a relatively far-axis region around the first transmitting portion that focuses and reflects the light reflected from the first reflecting portion; and a second transmitting portion, formed at a relatively far-axis region around the first reflecting portion, that refracts and transmits the light beam focused by the second reflecting portion as a peripheral light beam, wherein the maximum angle $\alpha$ between the optical axis and the peripheral light beam satisfies the condition of $30° \leq \alpha \leq 65°$. The optical pickup further includes the previously mentioned objective lens as a second objective lens, which is optionally placed into the optical path between a first objective lens and an optical medium. As a result, the NA of the objective lens unit can be increased up to 0.85 while the working distance $d_2$ is maintained to be 0.2 mm.

36 Claims, 5 Drawing Sheets

OBJECTIVE LENS FOR HIGH-DENSITY OPTICAL FOCUSING, AND OPTICAL PICKUP USING THE SAME

CROSS-REFERENCE TO RELATED APPLICATIONS

This application claims the benefit of Korean Application No. 99-41767, filed Sep. 29, 1999, in the Korean Industrial Property Office, the disclosure of which is incorporated herein by reference.

BACKGROUND OF THE INVENTION

1. Field of the Invention

The present invention relates to an objective lens having a high numerical aperture (NA) for high-density optical focusing, and an optical pickup using the objective lens, and more particularly, to an objective lens for high-density optical focusing, that can be manufactured using existing techniques to have a NA high enough for high-density optical focusing, and an optical pickup using the objective lens for high-density recording.

2. Description of the Related Art

Assuming that a single objective lens is used in an optical system, the objective lens for use in recording data on and reproducing data from an optical disk has a maximum NA of 0.6 due to limitations caused by the manufacturing process. As a result, it is impossible to reduce an allowable error below an aberration of $0.07\lambda^{rms}$. Examples of a conventional objective lens and an optical pickup using the conventional objective lens are shown in FIGS. 1 and 2.

Figure 1:
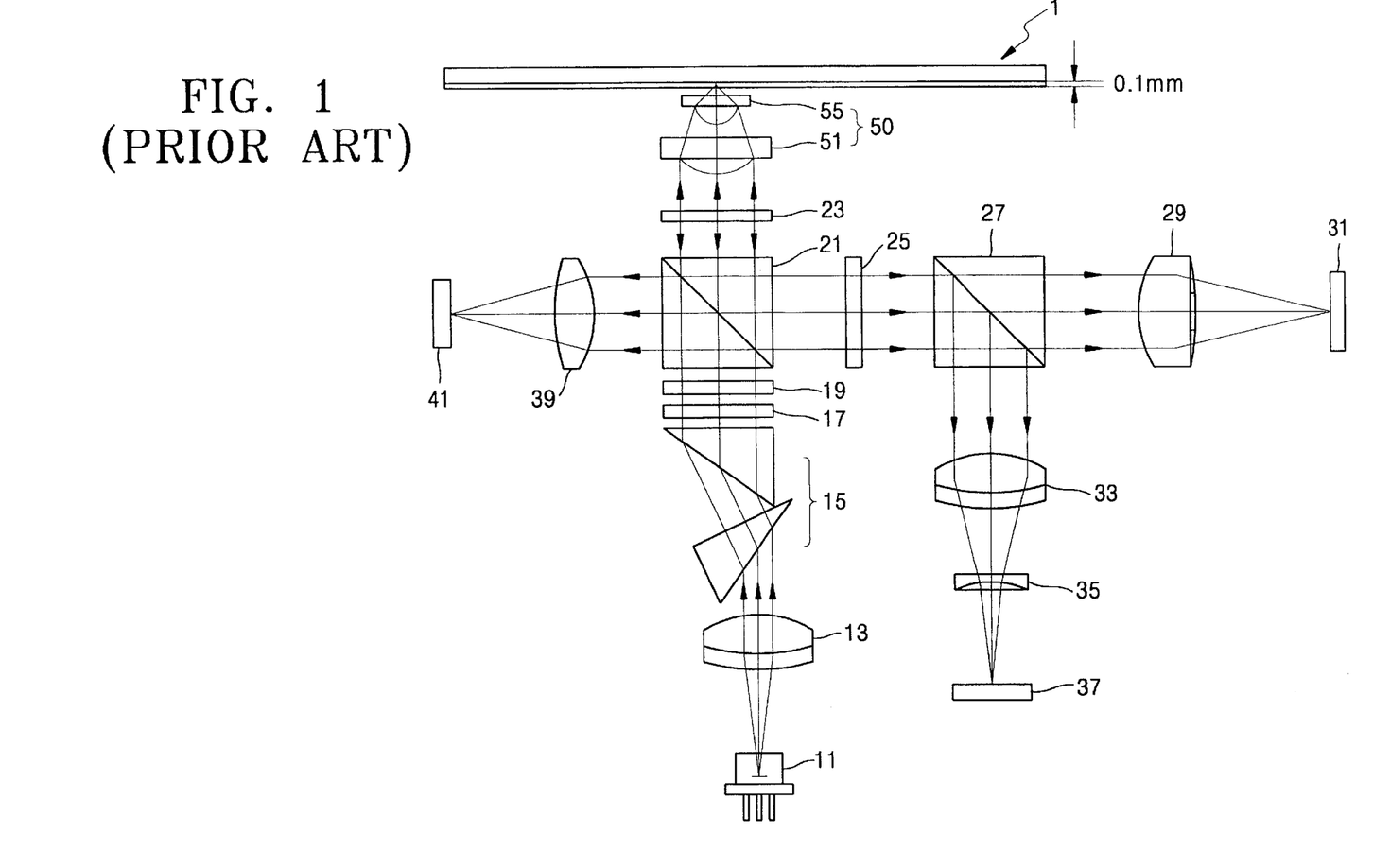
FIG. 1 shows the optical arrangement of a conventional optical pickup using an objective lens unit having a semi-spherical lens for high-density focusing.
Figure 2:
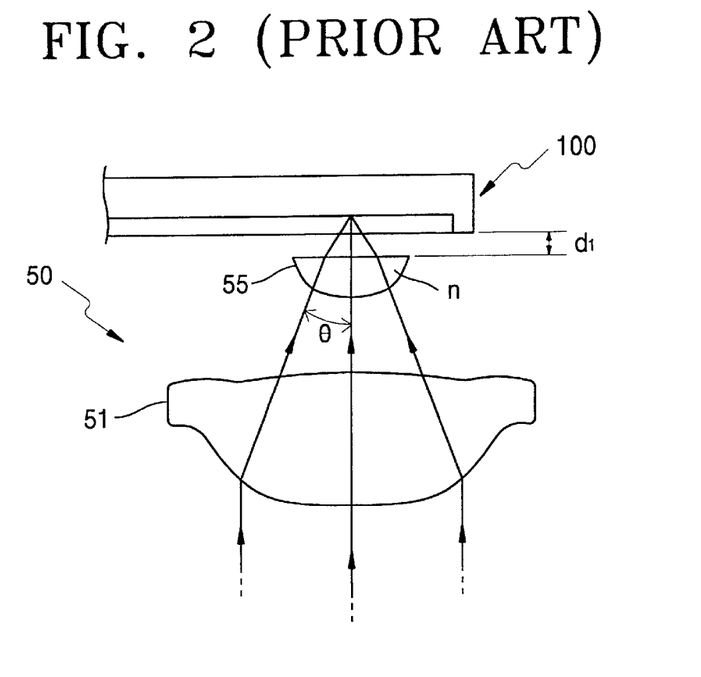
FIG. 2 shows the optical arrangement of the conventional objective lens unit shown in FIG. 1.

Referring to FIG. 1, the conventional optical pickup for recording and/or reproducing information is designed to enable a high-density recording of 20 gigabytes on an optical disk 1. The optical pickup includes a light source 11 having a wavelength of 400 nm, a grating 19 for diffracting and transmitting the incident light beam, a first polarization beam splitter (PBS) 21 for altering the light path according to a polarization direction, a $\lambda/4$ plate 23 for guiding a circular polarized light beam to the optical disk 1, an objective lens unit 50 having an NA of 0.85, a second PBS 27 for transmitting or reflecting the incident light beam reflected from the optical disk 1 and the first PBS 21, a first photodetector 31 for receiving the light beam that has passed through the second PBS 27 and detecting an information signal from the incident light beam, and a second photodetector 37 for receiving the light beam reflected from the second PBS 27 and detecting an error signal therefrom.

A collimating lens 13, a beam shaping prism 15, and a $\lambda/2$ plate 17 are arranged on an optical path between the light source 11 and the grating 19. The collimating lens 13 collimates the incident light beam, the beam shaping prism 15 shapes the incident light beam, and the $\lambda/2$ plate 17 delays the phase of the incident light beam. Another $\lambda/2$ plate 25, which delays the phase of the incident light beam, is arranged on the optical path between the first PBS 21 and the second PBS 27. A first condensing lens 29, which condenses the incident parallel light beam, is arranged between the second PBS 27 and the first photodetector 31. A second condensing lens 33, which condenses the incident parallel light beam, and an astigmatism lens 35, which causes astigmatism, are disposed between the second PBS 27 and the second photodetector 37. A third condensing lens 39 condenses the light beam emitted from the light source 11 and reflected from the first PBS 21, and a monitoring photodetector 41 monitors the optical power of the light source 11 from the light beam condensed by the third condensing lens 39.

The objective lens unit 50 includes an objective lens 51 to focus the incident light beam and a semi-spherical lens 55, which is arranged between the objective lens 51 and the optical disk 1, to increase the NA of the objective lens unit 50.

The objective lens unit 50 uses the semi-spherical lens 55 to further increase the NA of the objective lens unit 50 beyond the NA of 0.6 of the objective lens 51. Referring to FIG. 2, the NA of the semi-spherical lens 55 is proportional to the product of sin θ, wherein θ is the maximum incident angle of light onto the semi-spherical lens 55, and the refractive index n of the semi-spherical lens 55. Thus, the NA of the objective lens unit 50 can be increased up to 0.85 using a semi-spherical 1 lens 55 and an objective lens 51.

In order to reduce the size of a light spot focused on the optical disk 1 with such a high NA in the conventional optical pickup as shown in FIG. 1, the working distance $d_1$ between the optical disk 1 and the semi-spherical lens 55 must be as small as 0.1 mm. However, such a small distance $d_1$ hinders the optical disk 1, preventing it from stably seating on a turntable (not shown) and from rotating during operation. In addition, if the objective lens moves in the focusing direction within the range of ±0.7 mm, which is beyond the working distance d1, the focusing servo control must be precisely controlled within the range of 10 nm. Thus, it is difficult to manufacture the optical pickup on a mass production scale.

SUMMARY OF THE INVENTION

To solve the above problems, it is an objective of the present invention to provide an objective lens for high-density focusing that has a high numerical aperture (NA) and ensures a sufficient working distance with respect to a recording medium, and an optical pickup using the objective lens.

Additional objects and advantages of the invention will be set forth in part in the description which follows and, in part, will be obvious from the description, or may be learned by practice of the invention.

According to an aspect of the present invention, there is provided an objective lens comprising a first transmitting portion placed at a relatively near-axis region from the optical axis, that divergently transmits an incident light beam, a first reflecting portion that divergently reflects the incident light beam and faces the first transmitting portion, a second reflecting portion formed at a relatively far-axis region around the first transmitting portion that focuses and reflects the light beam reflected from the first reflecting portion, and a second transmitting portion formed at a relatively far-axis region around the first reflecting portion that refracts and transmits the light focused by the second reflecting portion as a peripheral light beam, wherein a maximum angle α between the optical axis and the peripheral light beam satisfies the condition of $30° \leq \alpha \leq 65°$.

According to another aspect of the present invention, there is provided an optical pickup comprising a light source for emitting a light beam, an optical path changing means for changing the traveling path of an incident light beam, an objective lens unit for focusing the incident light beam to form a light spot on the optical disk, and a photodetector for receiving the incident light beam reflected from the optical disk and passed through the objective lens and the optical path changing means. The objective lens unit comprises a first objective lens for focusing the incident light beam from the optical path changing means and a second objective lens arranged on the optical path between the first objective lens and the optical disk, to further focus the light beam condensed by the first objective lens, the second objective lens comprising a first transmitting portion formed at a region relatively near to the optical axis to divergently transmit the incident light beam, a first reflecting portion arranged facing the first transmitting portion, to divergently reflect the incident light beam, a second reflecting portion formed at a relatively far-axis region around the first transmitting portion, to focus the light beam reflected from the first reflecting portion toward the optical disk, and a second transmitting portion formed at a relatively far-axis region around the first reflecting portion, that diffracts and transmits the light beam condensed by the second reflecting portion.

BRIEF DESCRIPTION OF THE DRAWINGS

The above objectives and advantages of the present invention will become more apparent by describing in detail preferred embodiments thereof with reference to the attached drawings in which.

DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
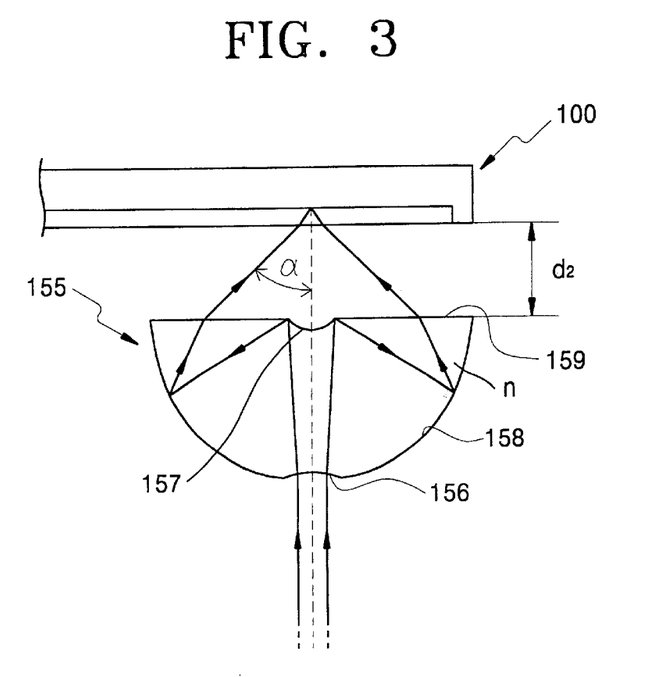
FIG. 3 shows the optical arrangement of an objective lens for high-density focusing according to an embodiment of the present invention, which is designed to accommodate a parallel incident light beam.

Referring to FIG. 3, an objective lens 155 for high-density focusing according to the present invention includes a first transmitting portion 156 that divergently transmits an incident light beam, a first reflecting portion 157 arranged facing the first transmitting portion 156, to divergently reflect the incident light beam, a second reflecting portion 158 arranged around the first transmitting portion 156, to condense the light beam reflected by the first reflecting portion 157, and a second transmitting portion 159 to refract and transmit the light beam reflected from the second reflecting portion 158.

The second transmitting portion 159 is positioned facing the optical disk 100. The first and second reflecting portions 157 and 158, and the first and second transmitting portions 156 and 159 are designed such that the working distance $d_2$ between the second transmitting portion 159 and an optical disk 100 is larger than the working distance $d_1$ (shown in FIG. 2) in a conventional optical pickup.

Preferably, the first transmitting portion 156, which removes optical field aberration, has a concave curvature. Also, the first transmitting portion 156 is designed with spherical and aspherical surfaces to minimize aberration. The first reflecting portion 157 has a convex reflecting surface for reflecting the incident light beam at a maximum angle, which maintains a high NA of 0.6 or more. The reflecting surface of the first reflecting portion 157 is formed to be convex toward the first transmitting portion 156. The second reflecting portion 158, which has a concave reflecting surface for minimizing optical aberration such as spherical aberration and coma aberration, reflects the incident light beam reflected by the first reflecting portion 157 toward the second transmitting portion 159. Conversely, when a light beam travels back through the objective lens 155 after having been reflected from the optical disk 100, the second reflecting portion 158 reflects the incident light beam from the second transmitting portion 159 toward the first reflecting portion 157. The second transmitting portion 159 has a planar surface, and thus can be easily processed. Preferably, a space enclosed by the first transmitting portion 156, the second reflecting portion 158, the first reflecting portion 157, and the second transmitting portion 159 is filled with an optical material having a refractive index n different from that of air. This difference enables the light reflected from the second reflecting portion 156 to be focused through the second transmitting portion 159 toward an optical disc 100.

FIG. 3 illustrates an example of the objective lens 155 for focusing a parallel incident light beam on the optical disk 100. For the parallel incident light bean, it is preferable that the optical disk 100 has a thickness of 0.4 mm or less, but more preferably, of 0.1 mm, so as to overcome coma aberration and astigmatism that occur within an objective lens having a high NA.

Preferably, to form a light spot suitable for reproduction from the optical disk 100, a diameter of the first transmitting portion 157 and an outer diameter of the second transmitting portion 159 satisfy condition (1) below. This condition shields the light beam transmitted through transmitting portion 159 from the light beam incident to the first reflecting portion 157, so that the effect of a spherical aberration can be sharply reduced and the size of the light spot can be minimized.

$$0.1 < \frac{\text{diameter of first reflecting portion}}{\text{outer diameter of second reflecting portion}} < 0.5 \quad (1)$$

Figure 4:
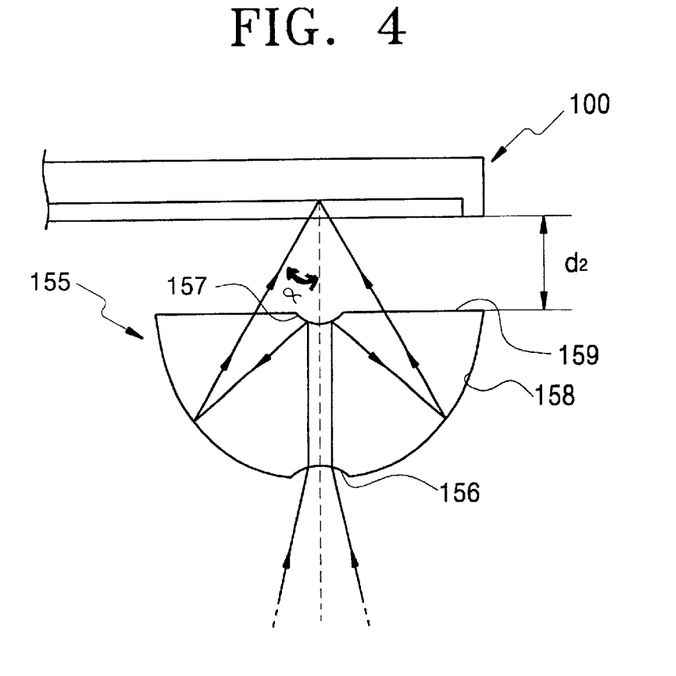
FIGS. 4 and 5 illustrate the optical arrangement of other embodiments of the objective lens for high-density focusing according to the present invention, which are designed to accommodate a condensing incident light beam.
Figure 5:
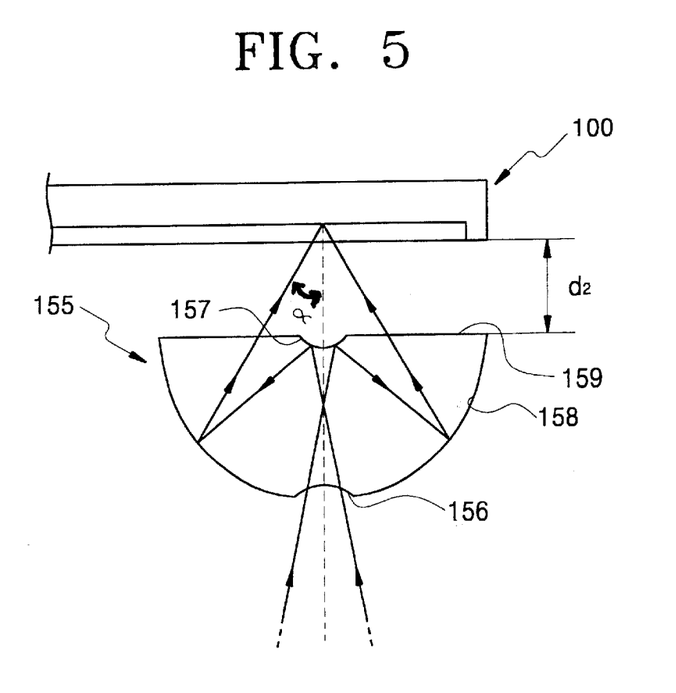

FIGS. 4 and 5 show the optical arrangement of objective lens 155 used with a condensing incident light beam according to an embodiment of the present invention. Each objective lens 155 shown in FIGS. 4 and 5 have the first and second transmitting portions 156 and 159, and the first and second reflecting portions 157 and 158, like the objective lens described with reference to FIG. 3. However, the design data are different from that of the objective lens 155 shown in FIG. 3.

Referring to FIG. 4, a predetermined condensing light beam entering the first transmitting portion 156 is divergently reflected from the first reflecting portion 157, and focused by the second reflecting portion 157 to form a high-density light spot on the optical disk 100.

Referring to FIG. 5, a condensing light beam enters the first transmitting portion 156 at a greater incident angle than that shown in FIG. 4. The incident light beam condenses and spreads out again while passing through the first transmitting portion 156, and then is divergently reflected by the first reflecting portion 157. The diverging light beam is then reflected and focused by the second reflecting portion 157 to form a high-density light spot on the optical disk 100.

To minimize the size of the light spot focused on the optical disk 100 with the increased working distance $d_2$, it is preferable that, in the objective lens 155 shown in FIGS. 3–5, the maximum angle α between the optical axis and the peripheral light beam emitted from the second transmitting portion 159 after having passed through the first transmitting portion 156 and been reflected by the first and second reflecting portions 157 and 158 satisfies condition (2).

$$30° \leq \alpha \leq 65° \quad (2)$$

Two examples of the optical data for the objective lens 155 having the above configuration are shown in Tables 1 and 2.

Tables 1 and 2 show the design data of the objective lens 155 shown in FIG. 3 used with parallel incident light beam when the working distance $d_2$ is 1.1 mm and 0.2 mm, respectively. Table 3 shows the aspherical coefficients of the aspherical surfaces listed in Tables 1 and 2.

TABLE 1

| | Radius (mm) | Thickness (mm) | Refractive Index | Dispersion |
|---|---|---|---|---|
| First transmitting surface | ∞ (aspherical surface 1) | 2.586105 | 1.526 | 50 |
| First reflecting surface | 0.38706 | −2.586105 | 1.526 | 50 |
| Second reflecting surface | 3.42277 (aspherical surface 2) | 2.655523 | 1.526 | 50 |
| Second transmitting surface | ∞ | 1.100000 | — | — |
| Disk | ∞ | 0.100000 | 1.583 | 50 |

TABLE 2

| | Radius (mm) | Thickness (mm) | Refractive Index | Dispersion |
|---|---|---|---|---|
| First transmitting surface | ∞ | 0.574577 | 1.526 | 50 |
| First reflecting surface | 0.08600 | −0.574577 | 1.526 | 50 |
| Second reflecting surface | 0.76177 (aspherical surface 3) | 0.590000 | 1.526 | 50 |
| Second transmitting surface | ∞ | 0.198714 | — | — |
| Disk | ∞ | 0.100000 | 1.583 | 50 |

TABLE 3

| Aspherical coefficient | K | A | B | C | D |
|---|---|---|---|---|---|
| Aspherical surface 1 | 0.000000 | 0.281823E+01 | −0.244324E+03 | 0.757918E+04 | −0.962123E+05 |
| Aspherical surface 2 | −0.257566 | 0.341730E−03 | −0.232088E−04 | 0.735984E−05 | −0.176553E−05 |
| Aspherical surface 3 | −0.086297 | −0.782050E−02 | −0.147428+00 | 0.646999E+00 | −0.347888E+01 |

Using the objective lens 155 having the above configurations according to the present invention, the objective lens 155 maintains the working distance $d_2$ to be 0.2 mm and 1.1 mm, respectively, has a NA of 0.6 or more, and eliminates the problem of lens-to-disk interference.

The objective lens having a high NA according to the present invention is applicable to miniature optical systems for microscopes, exposure apparatuses for use in the manufacture of semiconductor devices, and mastering apparatuses for manufacturing disks.

Figure 6:
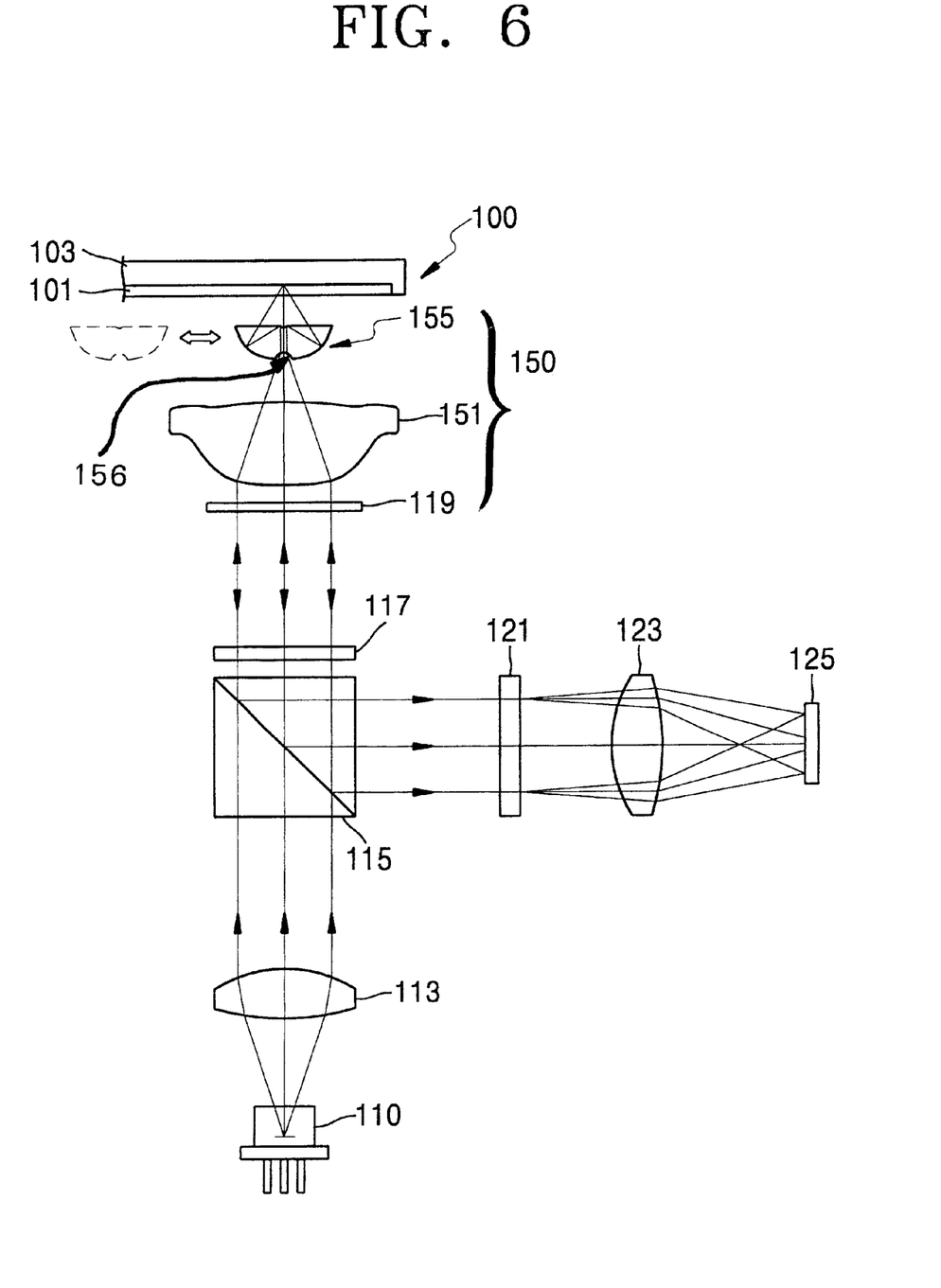
FIG. 6 shows the optical arrangement of an optical pickup using the high-density focusing objective lens according to an embodiment of the present invention.

FIG. 6 shows an embodiment of an optical pickup using the objective lens 155 that includes a light source 110 for emitting a light beam, an optical path changer for changing the traveling path of the incident light beam, an objective lens unit 150 for focusing the incident light beam to form a light spot on an optical disk 100, and a photodetector 125 for receiving the light reflected from the optical disk 100 to detect information and error signals. The optical pickup shown in FIG. 6 is compatible with an optical disk 101 having a thickness of 0.4 mm, or a high recording density of about 20 gigabytes, a digital versatile disk (DVD) 103 having a thickness of 0.6 mm, and a compact disk (CD, not shown) having a thickness of 1.2 mm.

The light source 110 may be a semiconductor laser for emitting light of a short wavelength of about 400 nm. The optical path changer includes a polarization beam splitter (PBS) 115 for transmitting or reflecting the components of the incident light beam according to their polarization, a λ/4 plate 117 arranged on the optical path between the PBS 115 and the optical disk 100, for delaying the phase of the incident light beam. A collimating lens 113 for collimating the incident light beam may further be arranged on the optical path between the light source 110 and the PBS 115.

The optical lens unit 150 includes a first objective lens 151 having an NA of 0.6 suitable for the DVD 103. A second objective lens 155 optionally placed on the optical path between the first objective lens 151 and the optical disk 100, and a variable diaphragm 119 arranged on the optical path before the first objective lens 151.

Figure 7:
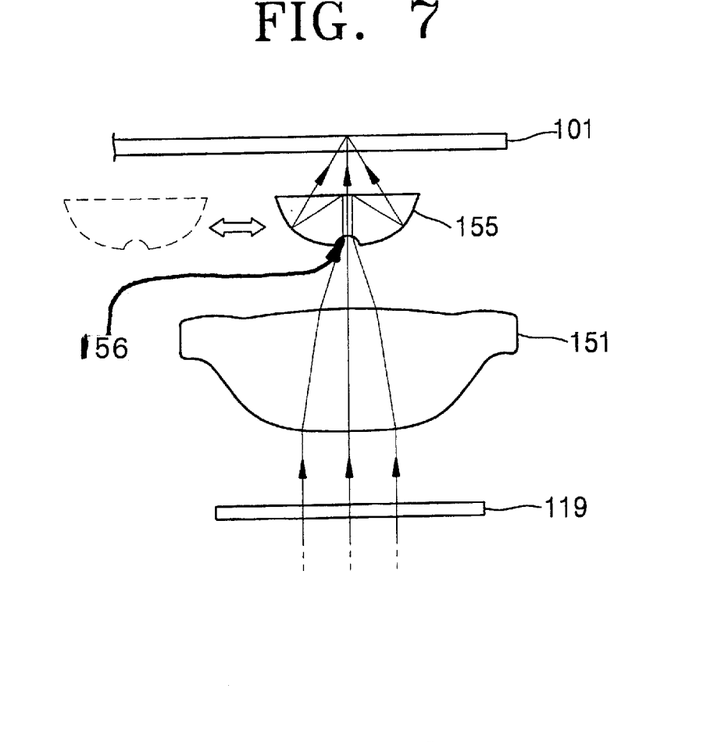
FIG. 7 shows the optical arrangement of the main portions in the optical pickup of FIG. 6 when a relatively thin optical disk is used.

As shown in FIG. 7, when the high-density optical disk 101, which is relatively thin is used, the objective lens unit 150 uses both the first and second objective lenses 151 and 155 to form a light spot on the high-density optical disk 101. However, if a relatively thick DVD 103 is used, the second objective lens 155 is removed from the objective lens unit 150 so that the incident light beam is focused onto the DVD 103 using the first objective lens 151 alone. Here, placing the second objective lens 155 into and removing it from the optical path can be achieved using a rotary-type or solenoid-type driving motor. If the rotary type driving motor is used, the second objective lens 155 is mounted on a rotary plate rotated by the motor, and then the rotation of the rotary plate is controlled to place or remove the second objective lens 155 to or from the optical path. Slidable solenoid-type driving motor driving techniques are well known to those skilled in the art, and thus description thereof will be omitted.

The first objective lens 151 has a NA of 0.6 and is used to form a light spot on the DVD 103 having a thickness of 0.6 mm. Preferably, the first objective lens 151 has an annular shielding type configuration, such as those disclosed in U.S. Pat. Nos. 5,665,957; 5,822,135; 5,909,424; and 5,987,924, incorporated herein by reference. As for such an annular shielding type objective lens, the focal position is separately adjusted for a near-axis region and a far-axis region, so that the objective lens is compatible with a CD (not shown) having a thickness of 1.2 mm.

The second objective lens 155 has the same configuration as that of the objective lens 155 shown in FIGS. 3 through 5. Thus, the second objective lens 155 includes the first transmitting portion 156 for divergently transmitting the incident light beam, the first reflecting portion 156 arranged facing the first transmitting portion 156, for divergently reflecting the incident light beam, the second reflecting portion 158 formed around the first transmitting portion 156, for focusing the light beam reflected by the first reflecting portion 157, and the second transmitting portion 159 for reflecting and transmitting the light beam reflected by the second reflecting portion 158 as a peripheral light beam. Preferably, the maximum angle a between the optical axis and the peripheral light beam incident on the optical disk 100 satisfies condition (2) above. The first and second transmitting portions 156 and 159, and the first and second reflecting portions 157 and 158 have the same configuration and function as those of the objective lens 155 of FIGS. 3 through 5.

Figure 8:
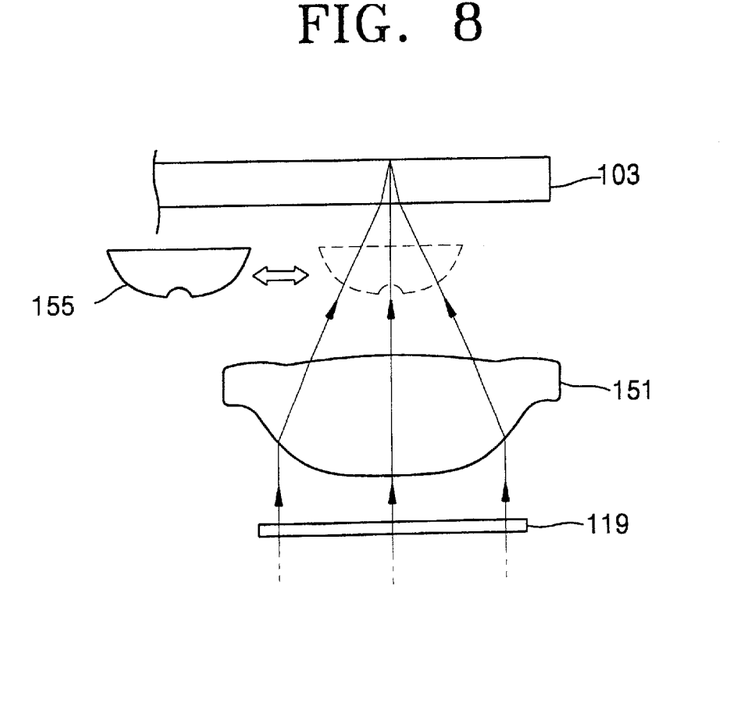
FIG. 8 shows the optical arrangement of the main portions in the optical pickup of FIG. 6 when a relatively thick optical disk is used.

For the optical pickup shown in FIGS. 6–8, the incorporation of the second objective lens 155 into the optical path enables the objective lens unit 150 to both have a high NA of 0.85. In addition, the optical pickup has a lower NA of 0.6 using the first objective lens 151 alone. As a result, a light spot can be accurately formed with a high-density on the high-density optical disk 101. Preferably, the high-density optical disk 101 has a thickness of 0.4 mm or less, more preferably, 0.1 mm or less, to account for the coma aberration and astigmatism.

For recording information on or reproducing information from the high-density optical disk 101, the variable diaphragm 119, which is a wavelength selective variable diaphragm, focuses the incident light beam through its narrow central region on the first transmitting portion 156. Meanwhile, for recording information on or reproducing information from the DVD 103, the incident light beam passes through a large portion of the variable diaphragm 119 to form a light spot on the DVD 103.

The photodetector 125, which receives the incident light beam reflected by the optical disk 100 and passed through the PBS 115, is divided into a plurality of portions for independent photoelectric conversion. The configuration of such a photodetector 125 is well known to one skilled in the art, and thus the description thereof will be omitted.

A holographic optical element (HOE) 121, which diffracts and transmits the incident light beam, splits the light beam into an error signal and an information signal. A condensing lens 123 condenses the light from the HOE 121. The HOE 121 and the condensing lens 123 are disposed along the optical path between the PBS 115 and the photodetector 125.

The objective lens having the above structure according to the present invention is advantageous in that the interference between the objective lens and the optical disk can be eliminated with an increased working distance $d_2$ of 0.2 mm or 1.1 mm at a high NA of 0.6 or more. The objective lens according to the present invention can be used as a lens for microscopes, exposure apparatuses for use in the manufacture of semiconductor devices, and mastering apparatuses for use in the manufacture of disks with a high NA, thereby minimizing the size of the optical system.

In the optical pickup according to the present invention, a second objective lens can be selectively disposed along the optical path while the working distance $d_2$ is maintained at 0.2 mm, so that the NA of the objective lens unit including the first objective lens of the optical pickup can be increased to 0.8. Also, the interference with the optical disk can be eliminated when information is recorded on or reproduced from a high-density optical disk having a thickness of 0.4 mm or less. Another advantage of the optical pickup is its compatibility with DVD or CD by selective placement or removal of the second objective lens into or away from the optical path.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An objective lens that receives an incident light beam along an optical axis, comprising:

a first transmitting portion placed at a relatively near-axis region from the optical axis, said first transmitting portion divergently transmits the incident light beam;

a first reflecting portion that divergently reflects the incident light beam from said first transmitting portion, said first reflecting portion facing the first transmitting portion;

a second reflecting portion formed at a relatively far-axis region around said first transmitting portion, said second reflecting portion focuses and reflects the light beam reflected from said first reflecting portion; and a second transmitting portion formed at a relatively far-axis region around said first reflecting portion, said second transmitting portion refracts and transmits the light beam focused by said second reflecting portion as a peripheral light beam, wherein a maximum angle α between the optical axis and the peripheral light beam satisfies the following condition: $30° \leq \alpha \leq 65°$.

2. The objective lens of claim 1, further comprising a space enclosed by said first and second transmitting portions and said first and second reflecting portions, wherein said space is filled with an optical material.

3. The objective lens of claim 1, wherein said first reflecting portion comprises a diameter, said second reflecting portion further comprises an outer diameter, and the diameter of said first reflecting portion and the outer diameter of said second reflecting portion satisfy the following condition in order to shield a central light beam incident to said first reflecting portion to reduce spherical aberration:

$$0.1 < \frac{\text{diameter of said first reflecting portion}}{\text{outer diameter of said second reflecting portion}} < 0.5.$$

4. An optical pickup for recording and/or reproducing an optical disc, comprising:

a light source to emit a light beam;

an optical path changer that changes a traveling path of an incident light beam;

an objective lens unit that focuses the incident light beam along an optical axis to form a light spot on the optical disk; and a photodetector to receive the incident light beam reflected from the optical disk that passed through said objective lens and said optical path changer, wherein said objective lens unit comprises:
a first objective lens that focuses the incident light from said optical path changer; and
a second objective lens arranged on the optical axis between the first objective lens and the optical disk, the second objective lens further focuses the light beam condensed by the first objective lens along the optical axis, the second objective lens comprising:
a first transmitting portion formed at a region relatively near the optical axis, the first transmitting portion divergently transmits the incident light beam;
a first reflecting portion arranged facing the first transmitting portion, the first reflecting portion divergently reflects the incident light beam;
a second reflecting portion formed at a relatively far-axis region around the first transmitting portion, the second reflecting portion focuses the light beam reflected from the first reflecting portion toward the optical disk; and
a second transmitting portion formed at a relatively far-axis region around the first reflecting portion, the second transmitting portion diffracts and transmits the light beam condensed by the second reflecting portion to form a peripheral light beam.

5. The optical pickup of claim 4, wherein a maximum angle α between the optical axis and the peripheral light beam satisfies the condition of $30° \leq \alpha \leq 65°$.

6. The optical pickup of claim 4, wherein the second objective lens further comprises a space filled with an optical material, wherein the space is defined by the first and second transmitting portions and the first and second reflecting portions.

7. The optical pickup of claim 4, wherein a diameter of the first reflecting portion and an outer diameter of the second reflecting portion satisfy the following condition in order to shield a central light beam entering the first reflecting portion to reduce spherical aberration:

$$0.1 < \frac{\text{diameter of first reflecting portion}}{\text{outer diameter of second reflecting portion}} < 0.5.$$

8. The optical pickup of claim 4, wherein the second objective lens is optionally placed into the optical path between the first objective lens and the optical disk such that both the first and second objective lenses are used to form a light spot on a relatively thin high-density optical disk, while only the first objective lens is used to form a light spot on a relatively thick optical disk.

9. The optical pickup of claim 4, wherein said objective lens unit further comprises a wavelength selective variable diaphragm, wherein the wavelength selective variable diaphragm comprises an aperture whose size varies depending on a wavelength of an incident light beam.

10. An objective lens that receives an incident light beam and focuses the incident light beam along an optical axis to a surface, comprising:
an internal reflecting portion to internally reflect the incident light beam and to transmit the internally reflected light beam through an opening not on the optical axis to the surface as a peripheral light beam,
wherein a maximum angle a between the optical axis and the peripheral light beam is $30° \leq \alpha \leq 65°$.

11. The objective lens of claim 10, wherein said internal reflecting portion internally reflects the incident light beam so as to maintain a numerical aperture of greater than 0.6.

12. The objective lens of claim 10, further comprising a first transmitting portion to receive and transmit the incident light beam to said internal reflecting portion, wherein said first transmitting portion comprises spherical and aspherical surfaces.

13. The objective lens of claim 10, further comprising a second transmitting portion to receive and transmit the internally reflected light beam as the peripheral light beam, wherein said second transmitting portion comprises a planar surface roughly parallel to the surface.

14. The objective lens of claim 10, further comprising a medium having a refractive index other than that of air, and wherein said internal reflecting portion internally reflects the incident light beam through said medium.

15. The objective lens of claim 10, further comprising a first transmitting portion to receive and transmit the incident light beam to said internal reflecting portion, wherein the light beam incident to said first transmitting portion is non-parallel.

16. An objective lens that receives an incident light beam and focuses the incident light beam along an optical axis to a surface, comprising:
an internal reflecting portion to internally reflect the incident light beam and to transmit the internally reflected light beam to the surface as a peripheral light beam,
wherein
a maximum angle α between the optical axis and the peripheral light beam is $30° \leq \alpha \leq 65°$, and
said internal reflecting portion comprises a convex surface to receive and reflect the incident light beam.

17. The objective lens of claim 16, further comprising a second transmitting portion to receive and transmit the internally reflected light beam as the peripheral light beam, and wherein said internal reflecting portion further comprises a second surface to receive the light beam reflected by the convex surface and reflect the received light to said second transmitting portion.

18. The objective lens of claim 17, wherein said internal reflecting portion internally reflects the incident light so as to maintain a numerical aperture of greater than 0.6.

19. The objective lens of claim 18, further comprising a first transmitting portion to receive and transmit the incident light beam to said internal reflecting portion, and wherein said first transmitting portion comprises spherical and aspherical surfaces.

20. The objective lens of claim 19, wherein said second transmitting portion comprises a planar surface roughly parallel to the surface.

21. The objective lens of claim 20, further comprising a medium having a refractive index other than that of air, and wherein
said internal reflecting portion internally reflects the light beam through said medium, and
said first transmitting surface transmits the light beam through said medium.

22. The objective lens of claim 21, wherein
said second transmitting portion has an outer diameter and a center,
the convex surface is located at the center of said second transmitting portion and further comprises a diameter, and
a ratio of the diameter of the convex surface to the outer diameter of said second transmitting portion is between 0.1 and 0.5.

23. The objective lens of claim 22, wherein the light beam incident to said first transmitting portion is non-parallel.

24. The objective lens of claim 17, wherein
said second transmitting portion has an outer diameter and a center,
the convex surface is located at the center of said second transmitting portion and further comprises a diameter, and
a ratio of the diameter of the convex surface to the outer diameter of said second transmitting portion is between 0.1 and 0.5.

25. An optical pickup for use with an optical disc, comprising:
a light source that emits a light;
an optical path changer that changes a traveling path of the light from said light source;
an objective lens unit that focuses the incident light from said optical path changer along an optical axis to form a light spot on the optical disk; and
a light detector to receive the light reflected from the optical disk through said objective lens and said optical path changer,
wherein said objective lens unit comprises a first objective lens comprising:
an internal reflecting portion to internally reflect the incident light and to transmit the internally reflected light through a non-axial opening to the optical disc as a peripheral light, and
wherein a maximum angle a between the optical axis and the peripheral light 30° ≦α≦65°.

26. An optical pickup for use with an optical disc, comprising:
a light source that emits a light;
an optical path changer that changes a traveling path of the light from said light source;
an objective lens unit that focuses the incident light from said optical path changer along an optical axis to form a light spot on the optical disk; and
a light detector to receive the light reflected from the optical disk through said objective lens and said optical path changer,
wherein said objective lens unit comprises a first objective lens comprising:
an internal reflecting portion to internally reflect the incident light and to transmit the internally reflected light to the optical disc as a peripheral light,
wherein a maximum angle a between the optical axis and the peripheral light 30° ≦α≦65°, and
wherein the internal reflecting portion comprises a convex surface to receive and reflect the incident light.

27. The optical pickup of claim 26, further comprising a second transmitting portion to receive and transmit the internally reflected light as the peripheral light, and wherein the internal reflecting portion further comprises a second surface to receive the light reflected by the convex surface and reflect the received light to the second transmitting portion.

28. The optical pickup of claim 27, wherein the internal reflecting portion internally reflects the incident light so as to maintain a numerical aperture greater than 0.6.

29. The optical pickup of claim 28, further comprising a first transmitting portion to receive and transmit the incident light to said internal reflecting portion, wherein the first transmitting portion comprises spherical and aspherical surfaces.

30. The optical pickup of claim 29, wherein the second transmitting portion comprises a planar surface roughly parallel to the optical disk.

31. The optical pickup of claim 30, wherein
the first objective lens further comprises a medium having a refractive index other than that of air,
the internal reflecting portion reflects the light through the medium, and
the first transmitting surface transmits the light through the medium.

32. The optical pickup of claim 31, wherein
the second transmitting portion comprises an outer diameter and a center,
the convex surface is located at the center of the second transmitting portion, and further comprises a diameter, and
a ratio of the diameter of the convex surface to the outer diameter of the second transmitting portion is between 0.1 and 0.5.

33. The optical pickup of claim 31, wherein the light incident to the first transmitting portion is non-parallel.

34. An optical pickup for use with an optical disc, comprising:
a light source that emits a light;
an optical path changer that changes a traveling path of the light from said light source;
an objective lens unit that focuses the incident light from said optical path changer along an optical axis to form a light spot on the optical disk; and
a light detector to receive the light reflected from the optical disk through said objective lens and said optical path changer,
wherein
said objective lens unit comprises a first objective lens comprising:
an internal reflecting portion to internally reflect the incident light and to transmit the internally reflected light to the optical disc as a peripheral light,
a maximum angle α between the optical axis and the peripheral light 30° ≦α≦65°,
said objective lens unit further comprises a second objective lens that has a numerical aperture of less than or equal to 0.6,
the first objective lens has a numerical aperture greater than 0.6, and
the first and/or second objective lenses are selectively disposed in the optical path in order to vary the numerical aperture above 0.6.

35. The optical pickup of claim 34, wherein the first objective lens is disposed in the optical path without the second objective lens in order to vary the numerical aperture above 0.6.

36. The optical pickup of claim 34, wherein the first objective lens is disposed in the optical path with the second objective lens in order to vary the numerical aperture above 0.6.

* * * * *

UNITED STATES PATENT AND TRADEMARK OFFICE
CERTIFICATE OF CORRECTION

PATENT NO.        : 6,430,139 B1                                          Page 1 of 1
APPLICATION NO.   : 09/671710
DATED             : August 6, 2002
INVENTOR(S)       : Jang-hoon Yoo et al.

It is certified that error appears in the above-identified patent and that said Letters Patent is hereby corrected as shown below:

Title Page, Item (56), U.S. PATENT DOCUMENTS: Add --2,656,761   10/27/1953 B.S Blaisse--

Title Page, Item (56): Add

--FOREIGN PATENT DOCUMENTS

| | | |
|---|---|---|
| 99/27532 | 03/1999 | WIPO |
| 0762403 | 03/1997 | Europe |
| 0910074 | 04/1999 | Europe |
| 0373700 | 06/1990 | Europe |
| 0918321 | 05/1999 | Europe |
| 3119498 | 12/1985 | Germany |
| 6214154 | 05/1994 | Japan-- |

Title Page, Item (56): Add

--OTHER DOCUMENTS

T. Narahara et al., "Optical Disc System for Digital Video Production." Vol. 39, No. 2b, Part 1, Jpn. J. Appl. Phys. pp. 912-919 (Feb. 2000).--

Signed and Sealed this

Twenty-seventh Day of March, 2007

JON W. DUDAS
*Director of the United States Patent and Trademark Office*